Aug. 14, 1934.  R. J. GRAY  1,970,373
GREASE GUN
Filed April 2, 1931
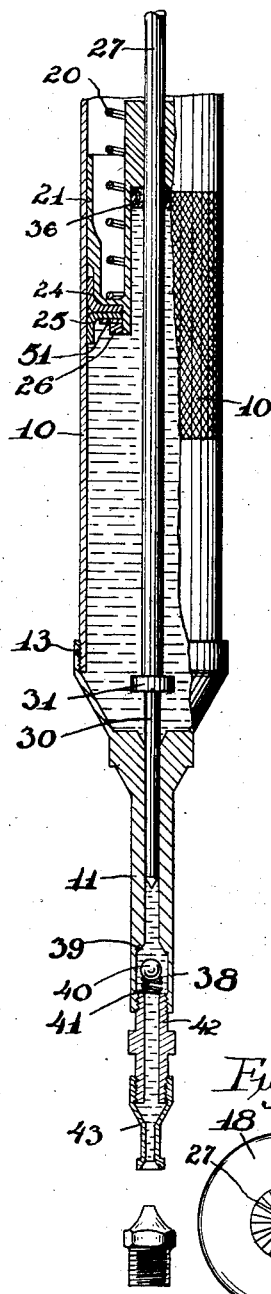
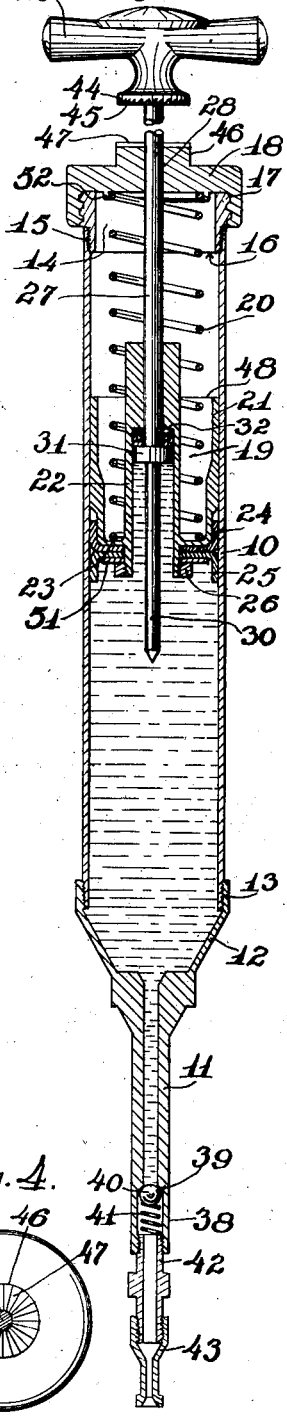
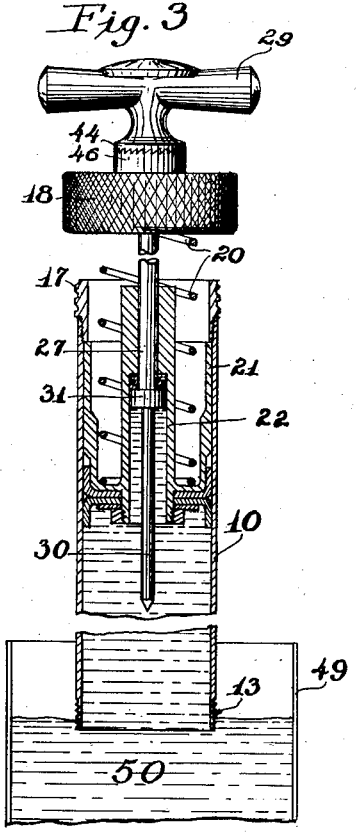
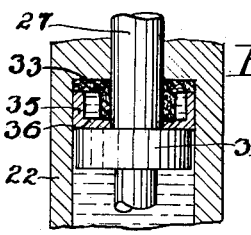
INVENTOR.
RUSSELL J. GRAY
BY
ATTORNEY.

Patented Aug. 14, 1934

1,970,373

UNITED STATES PATENT OFFICE 1,970,373

GREASE GUN

Russell J. Gray, Minneapolis, Minn.

Application April 2, 1931, Serial No. 527,164

9 Claims. (Cl. 221—47.4)

My invention relates to lubricating pumps, generally known as "grease guns," and it relates more particularly to a manually operable lubricant dispensing pump or hand gun, adapted for producing relatively high pressure, and adapted for facilitating the replacement of the lubricant within the gun or the "re-filling" of the gun.

The object of my invention is to provide a manually operable high-pressure grease gun of simple and efficient construction which will be particularly adapted for supplying grease or other lubricants to the grease cups, grease receptacles or "fittings" commonly installed on automobiles and other machinery.

For the purpose of illustrating my invention, I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring to the drawing in which like reference characters indicate like parts:

Figure 1 represents a longitudinal sectional view of a grease gun embodying my invention, with the high pressure piston shown in the retracted position.

Figure 2 represents a similar sectional view (with the upper part broken away), showing the high pressure piston in its relation to the high pressure cylinder.

Figure 3 represents a sectional view of my novel grease gun shown in the "re-filling" condition.

Figure 4 represents a top plan view of the removable head of my novel grease gun.

Figure 5 represents an enlarged fragmentary sectional view of the packing seal between the high-pressure and low-pressure piston.

Figure 6 represents a top plan view of the metallic packing retaining washer seen in Figure 5 in section.

According to my present invention, I provide a cylindrical body or housing 10, which forms or constitutes the housing or main body of the grease gun and which at the same time serves as the grease reservoir and low-pressure grease cylinder. To the front end of the cylindrical grease reservoir or low pressure grease cylinder 10, the high pressure grease cylinder 11 is detachably secured, in axial alignment. The detachable engagement between the high pressure cylinder 11 and the low pressure cylinder 10 is effected by means of the adapter portion 12, which is preferably formed integrally with the cylinder 11, and which is screw-threaded onto the front end of the low pressure cylinder 10, as at 13.

To the rear end of the cylindrical body 10, a collar 14 is rigidly and preferably permanently secured, by means of the screw-thread 15. The inner annular shoulder 16 of the collar 14, serves to limit the rearward movement of the low pressure piston, described hereinafter, and serves to confine said piston within the cylinder during the re-filling of the gun. The outer end of the collar 14 is provided with a coarse pitch external screw thread 17, which is adapted to receive the correspondingly internally threaded cap or head 18 of the gun.

Within the cylindrical body 10, the low-pressure piston 19 is slidably mounted, and is urged towards the front end of the cylinder 10 by the helical compression spring 20, which is confined between said piston 19 and the head or cap 18 of the gun.

The piston 19 includes the outer cylindrical shell 21, the outer cylindrical surface of which slidably fits the inner cylindrical surface of the cylinder 10, so that the piston unit 19 as a whole, will be guided in axial relation to the cylinder 10. The piston unit 19 also includes the co-axial inner cylindrical shell 22, which is connected to the outer cylindrical shell 21 of said piston unit 19 by the transverse annular wall 23. To the front end of the piston unit 19, a pair of oppositely disposed flanged or cupped leather washers 24 and 25 are secured, by means of the screw-threaded lock nut 26, threaded onto the end of the inner cylindrical shell 22, which projects through the central opening in said washers. If desired, the corresponding end of the cylindrical shell 22 may be turned outwardly or rolled over the metallic washer 51, which retains said leather washers 24 and 25. The outer cylindrical shell 21 is reduced in diameter at the front end thereof to an extent sufficient to accommodate the cylindrical flange of the rearward cupped leather washer 24, as indicated particularly in Figure 1.

The inner bore of the inner cylindrical shell 22 is reduced in diameter, towards the rear end thereof;—said reduced diameter bore being adapted to receive the slidable or reciprocable piston rod 27, co-axially disposed with respect to said piston unit 19 and cylinder 10. The cap or head 18 of the gun is provided with an axial opening 28 of the same diameter as the reduced diameter opening of the inner cylindrical shell 22 of the piston unit 19. The piston rod 27 extends through said opening 28, and terminates in a transverse handle member 29, by means of which said piston rod 27 and the co-axial piston or plunger 30 formed in continuation thereof, may be reciprocated to and fro with respect to the cylinder 10, and more particularly with respect to the high pressure cylinder 11; into which said high pressure piston 30 is adapted to project with each pumping or ejecting stroke.

An annular flange 31 is formed on the end of the piston rod 27, and intermediate the end thereof and the contiguous end of the piston 30;—said piston rod 27, piston 30 and flange 31 being preferably formed integrally with each other.

Surrounding the piston rod 27, and intermediate the flange 31 and the shoulder 32, a hat-shaped leather washer 33 is provided which is adapted to form a seal around the piston rod 27 against the passage of lubricant through the reduced diameter bore of the inner tubular shell 22, from the front of the piston to the back of the piston. To hold the hat-shaped leather sealing washer 33 in place, a cup-shaped metallic retainer member 34 is provided. The metallic retainer 34 is provided with a cylindrical portion 35 which fits snugly within the enlarged bore of the cylindrical shell 22 and is frictionally retained thereby, while the transverse flange 36 of said retainer member 34 tends to hold said leather washer 33 in place. Suitable openings 37 are provided in the transverse flange 36 to permit the free action of the grease of the inner sides of the leather washer 33, so that the sealing action of said leather washer 33 may be increased by the grease pressure bearing against said leather washer from within.

The bore of the high pressure cylinder 11 is enlarged somewhat at the front end, as at 38, thereby forming an enlarged chamber and shoulder 39 which is adapted to act as a valve seat. A ball check valve, or other suitable check valve 40 is disposed within the chamber 38 and is urged against the valve seat 39 by means of a helical compression spring 41;—said helical compression spring 41 being supported at the other or front end thereof by the screw-threaded member 42 which is screw-threaded into the end of the chamber 38. To the screw-threaded member 42, any suitable coupler or nozzle may be threadedly secured, as for instance the "push-contact" nozzle 43 shown in the drawing, which is adapted to make a sealing contact with grease-receiving "fittings" of the "push" type. If desired, the nozzle 43 may be replaced by a flexible hose having any suitable coupler at the free end thereof for detachable connection with any other type of grease-receiving "fitting".

The handle member 29 is provided with a hub 44, having ratchet teeth 45 cut into the face thereof. The cap or head 18 of the gun is provided with a similar hub or boss 46, having correspondingly inclined ratchet teeth 47 formed in the face thereof, as indicated in Figures 1 and 4;—the co-acting ratchet teeth 45 and 47 being so inclined, as to permit a rotative engagement between the handle 29 and the cap 18, in a direction which will thread said cap 18 onto the collar 14.

When the gun is assembled, the collar 14 is threaded or otherwise fixedly secured to the rear end of the cylinder 10 and may be permanently locked thereto. The shoulder 16 of said collar 14 then forms a permanent or fixed abutment which limits the rearward movement of the low-pressure or feeding piston 19, by engaging the rear shoulder 48 of said piston unit 19.

To fill the grease gun of my present invention, the high pressure cylinder 11 is detached from the front end of the low-pressure cylinder 10, by unscrewing at 13, thereby leaving the front end of said cylinder 10 open throughout the entire diameter thereof. The cap 18 is then likewise unscrewed at the coarse pitch screw 17. In this condition, illustrated in Figure 3, the helical compression spring 20 is extended to its full limit;—said limit being defined by the abutment of the shoulder 32 against the flange 31 on the piston rod (through the packing members 33 and 34) and the abutment of the ratchet-toothed boss or hub 46 of the cap 18 against the ratchet-toothed hub 44 of the handle member 29. In this condition, the piston unit 19 may be retracted in the cylinder 10 rearwardly, (upwardly as shown in the figures) until the rear shoulder 48 of said piston unit 19 abuts with the shoulder 16 of the collar 14. By so retracting the piston unit 19, by a rearward pull on the handle 29, grease may be drawn into the front end of the cylinder 10 as is shown particularly in Figure 3. Thus, with the cylinder 10 gripped in one hand, and the front end thereof dipped into a body of grease, the handle 29 is pulled up with the other hand until the movement of the piston unit 19 is stopped by the collar 14, at which position the front end of the cylinder 10 has been filled with grease to its full capacity. The high pressure cylinder 11 is then replaced by threading the adapter 12 thereof onto the front end of the cylinder 10. With the cylinder 10 still gripped in one hand and the handle member 29 gripped in the other hand, the handle member is forced towards the cylinder 10 so that the piston rod 27 is pushed through the piston unit 19 and the cap 18 is brought up against the collar 14. This movement is effected against the force of the spring 20, which is compressed by said movement. Since, when the handle 29 is pushed into the cylindrical grease reservoir 32 its maximum extent, the high-pressure piston 30 is also projected into the high-pressure cylinder 11 to its fullest extent, it follows that before the feed spring 20 is compressed to its fullest extent, the high-pressure piston 30 will have entered the high-pressure cylinder 11, thereby acting as a shut-off valve to prevent or to check any tendency of the grease to ooze out past the spring-retained check valve 40 as the feed spring 20 is compressed to its fullest extent, particularly while the cap 18 approaches the collar 14 and is screwed onto the same. Then with the same grip on the cylinder 10 and handle member 29; the handle member 29 is rotated so as to cause the threading of the cap 18 onto the collar 14, through the coarse pitch screw thread 17. When this thread is made tight, the gun is completely assembled again and ready for operation, with a full charge of grease in the low pressure or reservoir cylinder 10. In this condition, the supply of grease in the front end of the low pressure or reservoir cylinder 10 is directly acted upon by the spring pressure of the spring 20, so that the grease is fed constantly towards the high pressure cylinder 11. The tension of the check valve spring 41 is so proportioned with respect to the force of the spring 20, that the check valve 40 will retain and confine the grease against the feeding pressure or low pressure produced by the feeding spring 20. By reciprocating the piston rod 27 and the piston 30, by means of the handle member 29, the grease within the high pressure cylinder 11 is ejected under comparatively high pressure past the check valve 40 and through the nozzle or coupler 43 or through the flexible connecting hose which may be attached to the front end of the high pressure cylinder 11.

It will be observed, that in the use of the novel grease gun of my present invention, both the high pressure pumping action as well as the grease re-filling action may be effected, without the operator working against any spring. Thus, during the normal operation of the gun the movement of the piston rod and piston, 27 and 30 respectively, is entirely unhampered by any spring action. Similarly, the retraction of the piston unit 19, when sucking grease into the open front end of the cylinder 10, is likewise unhampered by any spring, because the spring has then already been expanded to the full limit of its expansion.

Owing to the relatively long outer cylindrical shell 21 of the piston unit 19, which fits neatly within the cylinder 10, and owing to the relatively long bearing afforded the piston rod 27, by the inner member 22 of the piston unit 19, both piston unit 19 as well as piston rod 27 are maintained in axial alignment during the re-filling operation when the cap 18 is detached from the rear end of the cylinder 10. Thus, the re-filling operation of the gun is greatly facilitated by the provision of the annular downwardly depending flange 52, on the inner side of the cap 18; the outer end of the helical compression spring 20 is maintained in axial alignment, particularly during the re-filling operation. The re-filling operation is illustrated more particularly in Figure 3, wherein the reservoir designated by the numeral 49 represents a barrel or original container of grease or other lubricant, into which the open front end of the cylinder 10 is inserted, with its opening just below the surface of the grease 50.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I hereby claim as new and desire to secure by Letters Patent, is:

1. A grease gun including an elongated cylindrical grease reservoir, a high pressure cylinder detachably secured to one end of said cylindrical grease reservoir, and in communication therewith, a cap detachably secured to the other end of said cylindrical grease reservoir and adapted for quick-attachable and quick-detachable engagement therewith, a low pressure grease feeding piston operatively disposed within said cylindrical grease reservoir, a spring intermediate said low pressure grease feeding piston and said cap tending to force said piston in a direction away from said cap, thereby normally to feed the grease to said high pressure cylinder, a manually operable piston adapted for reciprocation within said high pressure cylinder, thereby to eject the grease therefrom under a relatively high pressure, and means adapted normally to prevent the removal of the low pressure grease feeding piston from the cylindrical grease reservoir when said cap is detached from said cylindrical grease reservoir while the low pressure grease feeding piston is retracted during the re-filling operation.

2. A grease gun including an elongated cylindrical grease reservoir, a high pressure cylinder detachably secured to one end of said cylindrical grease reservoir, and in communication therewith, a cap detachably secured to the other end of said cylindrical grease reservoir and adapted for quick-attachable and quick-detachable engagement therewith, a low pressure grease feeding piston operatively disposed within said cylindrical grease reservoir, a spring intermediate said low pressure grease feeding piston and said cap, tending to force said low pressure grease feeding piston in a direction away from said cap, thereby normally to feed the grease to said high pressure cylinder, a manually operable piston rod extending through said cap and through said low pressure grease feeding piston and reciprocable with respect to both, an exterior manually operable handle carried at the outer end of said piston rod, a high pressure piston carried at the inner end of said piston rod in operative alignment with said high pressure cylinder, an abutment carried by said piston rod for engaging said low pressure grease-feeding piston, thereby to limit the expansion of said spring when the cap is detached from said cylindrical grease reservoir, and for permitting the retraction of said low pressure grease feeding piston by means of said manually operable handle member for refilling said cylindrical grease reservoir and means adapted normally to prevent the removal of the low pressure grease feeding piston from the cylindrical grease reservoir when the cap is detached from said cylindrical grease reservoir while the grease gun is being re-filled.

3. A grease gun including an elongated cylindrical grease reservoir, a high pressure cylinder detachably secured to one end of said cylindrical grease reservoir in stationary relation thereto and in communication therewith, a cap detachably secured to the other end of said cylindrical grease reservoir, a low pressure grease feeding piston operatively disposed within said cylindrical grease reservoir, a spring intermediate said low pressure grease feeding piston and said cap tending to force said piston in a direction away from said cap, thereby normally to feed the grease to said high pressure cylinder, a manually operable piston adapted for reciprocation within said high pressure cylinder, thereby to eject the grease therefrom under a relatively high pressure, means intermediate said cap and said low pressure grease feeding piston for limiting the expansion of said spring when said cap is detached from said cylindrical grease reservoir, and means to limit the movement of said low pressure grease feeding piston in the direction of said cap when the latter is detached from said cylindrical grease reservoir so as to prevent the removal of said low pressure grease feeding piston from said cylindrical grease reservoir.

4. A grease gun including an elongated cylindrical grease reservoir, a high pressure cylinder detachably secured to one end of said cylindrical grease reservoir in stationary relation thereto and in communication therewith, a cap detachably secured to the other end of said cylindrical grease reservoir, a low pressure grease feeding piston operatively disposed within said cylindrical grease reservoir, a spring intermediate said low pressure grease feeding piston and said cap, tending to force said low pressure grease feeding piston in a direction away from said cap, thereby normally to feed the grease to said high pressure cylinder, a manually operable piston rod extending through said cap and through said low pressure grease feeding piston and reciprocable with respect to both, an exterior manually operable handle carried at the outer end of said piston rod, a high pressure piston carried at the inner end of said piston rod in operative alignment with said high pressure cylinder and an abutment carried by said piston rod for engaging said low pressure grease-feeding piston, thereby to limit the expansion of said spring when the cap is detached from said cylindrical grease reservoir, and for permitting the retraction of said low pressure grease feeding piston by means of said manually operable handle member for refilling said cylindrical grease reservoir, and means to limit the movement of said low pressure grease feeding piston in the direction of said cap when the latter is detached from said cylindrical grease reservoir so as to prevent the removal of said low pressure grease feeding piston from said cylindrical grease reservoir.

5. A grease gun including an elongated cylindrical grease reservoir, a high pressure cylinder detachably secured to one end of said cylindrical grease reservoir, and in communication therewith, a cap detachably secured to the other end of said cylindrical grease reservoir, a low pressure grease feeding piston operatively disposed within said cylindrical grease reservoir, a spring intermediate said low pressure grease feeding piston and said cap tending to force said piston in a direction away from said cap, thereby normally to feed the grease to said high pressure cylinder, a manually operable piston adapted for reciprocation within said high pressure cylinder, thereby to eject the grease therefrom under a relatively high pressure, means intermediate said cap and low pressure grease feeding piston for limiting the expansion of said spring when said cap is detached from said cylindrical grease reservoir, an exterior handle member connected to the outer end of said high pressure piston, and means intermediate said handle member and said cap for effecting a rotative engagement between said handle member and said cap, at will, in a direction which will attach said cap to said cylindrical grease reservoir.

6. A grease gun including an elongated cylindrical grease reservoir, a high pressure cylinder detachably secured to one end of said cylindrical grease reservoir, and in communication therewith, a cap detachably secured to the other end of said cylindrical grease reservoir, a low pressure grease feeding piston operatively disposed within said cylindrical grease reservoir, a spring intermediate said low pressure grease feeding piston and said cap, tending to force said low pressure grease feeding piston in a direction away from said cap, thereby normally to feed the grease to said high pressure cylinder, a manually operable piston rod extending through said cap and through said low pressure grease feeding piston and reciprocable with respect to both, an exterior manually operable handle carried at the outer end of said piston rod, a high pressure piston carried at the inner end of said piston rod in operative alignment with said high pressure cylinder and an abutment carried by said piston rod for engaging said low pressure grease feeding piston, thereby to limit the expansion of said spring when the cap is detached from said cylindrical grease reservoir, and for permitting the retraction of said low pressure grease feeding piston by means of said manually operable handle member for refilling said cylindrical grease reservoir, and means intermediate said handle member and said cap for effecting a rotative engagement between said handle member and said cap, at will, in a direction which will attach said cap to said cylindrical grease reservoir.

7. A grease gun including an elongated cylindrical grease reservoir, a high pressure cylinder detachably secured to one end of said cylindrical grease reservoir, and in communication therewith, a cap detachably secured to the other end of said cylindrical grease reservoir, a low pressure grease feeding piston operatively disposed within said cylindrical grease reservoir, a spring intermediate said low pressure grease feeding piston and said cap tending to force said piston in a direction away from said cap, thereby normally to feed the grease to said high pressure cylinder, a manually operable piston adapted for reciprocation within said high pressure cylinder, thereby to eject the grease therefrom under a relatively high pressure, means intermediate said cap and said low pressure grease feeding piston for limiting the expansion of said spring when said cap is detached from said cylindrical grease reservoir, and means to limit the movement of said low pressure grease feeding piston in the direction of said cap when the latter is detached from said cylindrical grease reservoir so as to prevent the removal of said low pressure grease feeding piston from said cylindrical grease reservoir, an exterior handle member connected to the outer end of said high pressure piston, and means intermediate said handle member and said cap for effecting a rotative engagement between said handle member and said cap, at will, in a direction which will attach said cap to said cylindrical grease reservoir.

8. A grease gun including an elongated cylindrical grease reservoir, a high pressure cylinder detachably secured to one end of said cylindrical grease reservoir, and in communication therewith, a cap detachably secured to the other end of said cylindrical grease reservoir, a low pressure grease feeding piston operatively disposed within said cylindrical grease reservoir, a spring intermediate said low pressure grease feeding piston and said cap, tending to force said low pressure grease feeding piston in a direction away from said cap, thereby normally to feed the grease to said high pressure cylinder, a manually operable piston rod extending through said cap and through said low pressure grease feeding piston and reciprocable with respect to both, an exterior manually operable handle carried at the outer end of said piston rod, a high pressure piston carried at the inner end of said piston rod in operative alignment with said high pressure cylinder and an abutment carried by said piston rod for engaging said low pressure grease feeding piston, thereby to limit the expansion of said spring when the cap is detached from said cylindrical grease reservoir, and for permitting the retraction of said low pressure grease feeding piston by means of said manually operable handle member for refilling said cylindrical grease reservoir, and means to limit the movement of said low pressure grease feeding piston in the direction of said cap when the latter is detached from said cylindrical grease reservoir so as to prevent the removal of said low pressure grease feeding piston from said cylindrical grease reservoir, and means intermediate said handle member and said cap for effecting a rotative engagement between said handle member and said cap, at will, in a direction which will attach said cap to said cylindrical grease reservoir.

9. A portable grease gun including an elongated cylindrical grease reservoir, a high pressure grease cylinder detachably secured to the front end thereof and communicable therewith, a high pressure grease piston operably associated with said high pressure grease cylinder, a cap detachably secured to the other end of the cylindrical grease reservoir, a low pressure grease feeding piston operatively mounted within said cylindrical grease reservoir, a spring operatively interposed between said low pressure grease feeding piston and said cap, means for retracting said low pressure grease feeding piston in the direction of the capped end of the cylindrical grease reservoir for sucking grease into the other end thereof while the high pressure grease cylinder is in detached relation to the cylindrical grease reservoir, and means normally to prevent the removal of said low pressure grease feeding piston from said cylindrical grease reservoir while said cap is detached, said cap being adapted to be detached during the re-filling of the grease gun, whereby said grease gun may be suction-filled through the front end of the cylindrical grease reservoir while the force of the feed spring is neutralized.

RUSSELL J. GRAY.